(12) United States Patent
Boe (10) Patent No.: US 9,978,516 B2
(45) Date of Patent: May 22, 2018

(54) HIGH PRESSURE RESISTANT CAPACITOR ASSEMBLY AND ASSEMBLY METHOD

(71) Applicant: Siemens Aktiengesellschaft, Munich (DE)

(72) Inventor: Ove Boe, Tanem (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days. days.

(21) Appl. No.: 15/325,556

(22) PCT Filed: Jul. 29, 2015

(86) PCT No.: PCT/EP2015/067355
§ 371 (c)(1),
(2) Date: Jan. 11, 2017

(87) PCT Pub. No.: WO2016/020233
PCT Pub. Date: Feb. 11, 2016

(65) Prior Publication Data
US 2017/0301463 A1    Oct. 19, 2017

(30) Foreign Application Priority Data
Aug. 7, 2014  (EP) .................... 14180241

(51) Int. Cl.
*H01G 4/04* (2006.01)
*H01G 2/10* (2006.01)
(Continued)

(52) U.S. Cl.
CPC ............. *H01G 2/106* (2013.01); *H01G 2/103* (2013.01); *H01G 4/04* (2013.01); *H01G 4/1272* (2013.01); *H01G 4/14* (2013.01)

(58) Field of Classification Search
CPC ............ H01G 4/30; H01G 4/015; H01G 4/10; H01G 4/224; H01G 4/35
See application file for complete search history.

(56) References Cited

U.S. PATENT DOCUMENTS 3,275,902 A    9/1966  McHugh et al.
4,992,910 A *  2/1991  Evans ...................... H01G 9/12
                                                           361/502
(Continued)

FOREIGN PATENT DOCUMENTS

CN    103515154 A    1/2014
FR       1581052 A    9/1969
(Continued)

OTHER PUBLICATIONS

European Search Report dated Feb. 12, 2015.
International Search Report and Written Opinion dated Oct. 13, 2015.

*Primary Examiner* — Nguyen Ha
(74) *Attorney, Agent, or Firm* — Harness, Dickey & Pierce, P.L.C.

(57) ABSTRACT

A capacitor assembly includes at least two capacitor stacks, which have a layer structure including a top layer and a bottom layer. A support assembly supports the capacitor stacks. The capacitor stacks are stacked on top of each other in the support assembly. The support assembly has a compression member which compresses the at least two capacitor stacks in a direction substantially perpendicular to the layer structure. A pressure distribution arrangement adjusts the distribution of the pressure applied to the capacitor stacks by the compression member.

39 Claims, 3 Drawing Sheets

(51) Int. Cl.
 *H01G 4/14* (2006.01)
 *H01G 4/12* (2006.01)

(56) References Cited

U.S. PATENT DOCUMENTS

| | | | | |
|---|---|---|---|---|
| 5,420,747 A | * | 5/1995 | Ivanov | H01G 9/155 |
| | | | | 361/502 |
| 2011/0164344 A1 | * | 7/2011 | Bo | H01G 2/10 |
| | | | | 361/272 |
| 2013/0342294 A1 | | 12/2013 | Aarskog | |
| 2014/0055909 A1 | * | 2/2014 | Ning | H01G 4/30 |
| | | | | 361/301.4 |
| 2014/0087231 A1 | | 3/2014 | Meintschel | |
| 2015/0131202 A1 | * | 5/2015 | Masuda | H01G 4/38 |
| | | | | 361/301.4 |
| 2016/0247631 A1 | * | 8/2016 | Aarskog | H01G 2/10 |
| 2016/0254093 A1 | * | 9/2016 | Baechle | H01G 4/30 |
| | | | | 361/301.4 |

FOREIGN PATENT DOCUMENTS

| | | |
|---|---|---|
| GB | 384962 A | 12/1932 |
| GB | 500167 A | 2/1939 |
| JP | 2008034422 A | 2/2008 |

\* cited by examiner

HIGH PRESSURE RESISTANT CAPACITOR ASSEMBLY AND ASSEMBLY METHOD

PRIORITY STATEMENT

This application is the national phase under 35 U.S.C. § 371 of PCT International Application No. PCT/EP2015/067355 which has an International filing date of Jul. 29, 2015, which designated the United States of America and which claims priority to European patent application number EP14180241.3 filed Aug. 7, 2014, the entire contents of which are hereby incorporated herein by reference.

FIELD

An embodiment of the invention generally relates to a capacitor assembly, in particular for subsea use, and/or generally realtes to a method of assembling a capacitor assembly.

BACKGROUND

Different types of capacitors are known, for example film foil capacitors which are inductive capacitors and which are generally manufactured by winding or rolling up a film including dielectric and metal layers, for example a Mylar layer. Another type is a metalized film capacitor which can be made by winding one or more films in several turns around the core, removing the core and cutting out flat sections of the winding, or cutting out curved sections of the winding and forming them into a flat shape, for example by stamping. The cut-up portion has a structure of alternating dielectric layers and metal layers, for example metal foil or metal film layers. On a small portion of the dielectric layer, no metal is film is present, but a so called free margin in formed. This free margin is alternated between the two sides of the capacitor so that by metal spraying the respective opposite side surfaces of the cut out capacitor, two electric terminals can be formed by which the metal layers in the layer structure are contacted alternatingly. In such configuration, two neighboring metal layers are separated by a dielectric layer and form a capacitor, so that the cut-out capacitor essentially corresponds to a parallel connection of plural capacitances. Such cut out capacitor with its metalized sides can be termed capacitor stack.

When attempting to deploy such metalized film capacitor in a high pressure environment, for example inside a pressure compensated subsea enclosure which is installed at the ocean floor, several problems are encountered. In such enclosure, the metalized film capacitor is exposed to the ambient pressure, which at an installation depth of up to 3.000 meters and more results in a pressure of 300 bar or more prevailing in the environment in which the capacitor is installed. Gas that is trapped between the layers of the capacitor may damage the capacitor upon application of such high pressures. Furthermore, the layers may delaminate in such high pressure environment. The layers of the capacitor may experience buckling or wrinkling, which generally leads to a failure of the capacitor.

Furthermore, it was found that such capacitor stack may not have a capacitance that is high enough for the intended use, for example in the DC link of a subsea variable speed drive which provides AC frequency conversion for driving a subsea load, such as the electric motor of a subsea pump, subsea compressor or the like.

The document GB 500 167 A discloses a ceramic high tension electric condenser that include a column of superimposed ceramic plates provided with metal layers constituting the condenser plates. Springs are interposed between the plates to obtain good conductive connection between adjacent metal layers.

The document US 2014/0087231 A1 discloses an energy storage apparatus in form of a battery having plural galvanic cells, such as lithium ion cells which are pressed against each other by means of two clamping straps.

The document FR 1 581 052 A discloses a condenser with plural flat condenser coils that are separated by insulating plates.

SUMMARY

The inventors have discovered that it is thus desirable to provide a capacitor that is suitable for a subsea use, and that can be operated in a high pressure environment preferably up to or even in excess of 300 bars. The inventors have further discovered that it is further desirable to provide such capacitor with a high enough capacitance that is suitable for the above mentioned subsea applications, in particular for being used as a DC link capacitor in a subsea variable speed drive.

Accordingly, the inventors have discovered that there is a need to mitigate at least some of the drawbacks mentioned above and to provide a capacitor that is suitable for subsea use.

The claims describe embodiments of the invention.

According to an embodiment of the invention, a capacitor assembly comprising at least two capacitor stacks is provided. The capacitor stacks have a layer structure which includes a top layer and a bottom layer. The capacitor assembly further includes a support assembly for supporting the capacitor stacks. The capacitor stacks are stacked on top of each other in the support assembly. Stacked on top of each other means that the bottom layer and the top layer of neighboring capacitor stacks face each other. The support assembly has a compression member which compresses the at least two capacitor stacks in a direction substantially perpendicular to the layer structure. The compression member may apply a compressive force to the layer structure so as to allow a deployment of the capacitor assembly in a high pressure environment. The capacitor assembly further includes a pressure distribution arrangement which is configured to adjust the distribution of the pressure applied to the capacitor stacks by the compression member.

According to a further embodiment of the invention, a subsea device, in particular a subsea variable speed drive, is provided. The subsea device comprises a subsea enclosure filled with dielectric liquid and a pressure compensator configured to balance the pressure inside the subsea enclosure to a pressure prevailing in a medium outside the subsea enclosure. Furthermore, the device comprises a capacitor assembly that is configured in accordance with any of the described embodiments. The capacitor assembly is arranged in the subsea enclosure and is submerged in the dielectric liquid. The capacitor assembly is exposed to the pressure inside the subsea enclosure. By using the capacitor assembly in such subsea device, advantages similar to the ones outlined further above may be achieved.

According to a further embodiment of the invention, a method of assembling a capacitor assembly is provided. The method comprises the steps of providing a support assembly, stacking at least two capacitor stacks in the support assembly and providing between neighboring capacitor stacks a pressure distribution element when stacking the capacitor stacks. The capacitor stacks are metalized film capacitor stacks having a layer structure including a top layer and a bottom layer, and the capacitor stacks are stacked on top of each other. By providing the pressure distribution element between neighboring capacitor stacks, a pressure distribution arrangement is obtained. A further step includes the compression of the at least two capacitor stacks in the direction substantially perpendicular to the layer structure by means of a compression member of the support assembly. The pressure distribution arrangement is provided so as to adjust the distribution of the pressure applied to the capacitor stacks by the compression member. The layers of the capacitor stacks may experience compression when the capacitor assembly is deployed in a high pressure environment. The pressure distribution arrangement may be configured so as to provide a more uniform distribution of the pressure across the layer structure of the capacitor stacks when the capacitor assembly is deployed in a high pressure environment in which layers of the capacitor stacks experience compression.

It is to be understood that the features mentioned above and those that are explained below can be used not only in the respective combinations indicated, but also in other combinations or in isolation, without leaving the scope of the present invention. For example, method steps described above with respect to the capacitor assembly may form part of embodiments of the method.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION OF THE EXAMPLE EMBODIMENTS

According to an embodiment of the invention, a capacitor assembly comprising at least two capacitor stacks is provided. The capacitor stacks have a layer structure which includes a top layer and a bottom layer. The capacitor assembly further includes a support assembly for supporting the capacitor stacks. The capacitor stacks are stacked on top of each other in the support assembly. Stacked on top of each other means that the bottom layer and the top layer of neighboring capacitor stacks face each other. The support assembly has a compression member which compresses the at least two capacitor stacks in a direction substantially perpendicular to the layer structure. The compression member may apply a compressive force to the layer structure so as to allow a deployment of the capacitor assembly in a high pressure environment. The capacitor assembly further includes a pressure distribution arrangement which is configured to adjust the distribution of the pressure applied to the capacitor stacks by the compression member.

The layers of the capacitor stacks may experience compression when the capacitor assembly is deployed in a high pressure environment. The pressure distribution arrangement may be configured so as to provide a more uniform distribution of the pressure across the layer structure of the capacitor stacks when the capacitor assembly is deployed in a high pressure environment in which layers of the capacitor stacks experience compression.

By the support assembly including the compression member, it may be prevented that the layers of the capacitor stacks become buckled or wrinkled and delaminate, when the capacitor assembly is deployed in a high pressure environment, such as in a pressure compensated subsea enclosure that is installed at the sea floor. The support assembly furthermore allows the use of two or more capacitor stacks which are stacked on top of each other, so that a desired capacitance value of the capacitor assembly can be achieved.

The inventors of the present application have recognized that when stacking such capacitor stacks on top of each other, the pressure applied by the compression member may mostly be taken by the metalized sides of the capacitor stacks, since the dielectric layers of the capacitor stack experience compression under such high ambient pressures, so that the pressure applied to a central portion of the respective capacitor stack is relatively low. By way of the pressure distribution arrangement, the pressure can be distributed more evenly across the layer structure of the capacitor stacks, thus improving the reliability of the capacitor assembly and decreasing the possibility of wrinkling, buckling and delamination of the layer structure of the capacitor stacks. By way of the pressure distribution arrangement, the pressure may in particular be redistributed from metalized side surfaces of the capacitor stacks to the central portion of the capacitor stacks. Accordingly, the embodiment provides a reliable capacitor assembly that is suitable for subsea use, the capacitance of which can be adjusted to the particular application by including fewer or more capacitor stacks.

The layer structure of each capacitor stack may have a plurality of metal layers and dielectric layers arranged in an alternating order.

The capacitor stacks may for example be metalized film or foil capacitor stacks.

In an embodiment, the pressure distribution arrangement is configured to adjust the distribution of the pressure such that pressure differences over the area of the layers of the capacitor stacks are reduced. Accordingly, by way of the pressure distribution arrangement, the difference in pressure applied to the periphery of the capacitor stacks and to the center of the capacitor stacks may be reduced, even when the layers of the capacitor stacks experience compression that causes a reduction of the pressure in the central region of the stacks.

In an embodiment, each capacitor stack may have a predetermined design pressure range for the compression of the capacitor stack by way of the compression member. The pressure distribution arrangement may be configured to adjust the distribution of the pressure such that over the area of the capacitor stack, the variation of the applied pressure is smaller than the design pressure range. Preferably, the applied pressure is within the design pressure range. Accordingly, even when the layers of the capacitor stacks are compressed when the capacitor assembly is deployed in a subsea environment, the pressure between layers of the capacitor stacks may still remain within the design pressure range. The design pressure range may in particular be a pressure range in which the capacitor stacks exhibit a self-healing property.

As an example, the design pressure range may lie within the pressure range of about 1 bar to about 50 bar, preferably in the pressure range of about 1 bar to about 20 bar. It should be clear that these pressures refer to the pressure that is being applied to the capacitor stack by way of the compression member. The pressures of the high pressure environment may be applied in addition to the capacitor stacks and may lie in a different pressure range.

A high pressure environment may be a pressure compensated subsea enclosure that is installed at the sea floor. In particular, a high pressure environment may be an environment having a pressure of at least 100 bar, at least 200 bar or at least 300 bar. It should be clear that such subsea device can be installed at different water depths and that the pressures to which the subsea capacitor assembly is exposed may vary accordingly. A high pressure environment may be an environment having a pressure in a range between about 50 bar and about 500 bar, in particular between about 100 bar and about 450 bar. It should be clear that the layers generally also experience compression at pressures higher than the above mentioned limits.

In an embodiment, the pressure distribution arrangement may be configured such that the pressure applied by way of the compression member to the top or bottom layer of a capacitor stack is substantially uniform over the area of the top or bottom layer. The reliability of the capacitor assembly may thus be improved.

In an embodiment, the pressure distribution arrangement comprises a pressure distribution element arranged between the two capacitor stacks. The pressure distribution element may be arranged between the top layer of one capacitor stack and the bottom layer of the neighboring capacitor stack. By adjusting the geometry of such pressure distribution element, the distribution of the pressure that is applied by the compression member to the respective capacitor stack can be adjusted.

The capacitor assembly may comprise plural capacitor stacks, and the pressure distribution arrangement may comprise a pressure distribution element arranged between each two neighboring capacitor stacks. In such configuration, a relatively even pressure distribution becomes possible also for capacitor assemblies including a relatively large number of capacitor stacks.

The capacitor assembly may for example comprise between about 3 and about 25 capacitor stacks, preferably between about 10 and about 20 capacitor stacks. 12 to 17 capacitor stacks may be used, e.g. 15 capacitor stacks.

When stacked on top of each other, the capacitor stacks of the capacitor assembly may together have a height of between about 10 and about 100 centimeters, the height may for example be between about 40 and about 60 centimeters when 15 capacitor stacks are stacked on top of each other.

The support assembly may comprise a top plate and a bottom plate. The pressure distribution arrangement may comprise a pressure distribution element arranged between the top plate and the neighboring capacitor stack. Additionally or alternatively, the pressure distribution arrangement may comprise a pressure distribution element arranged between the bottom plate and a neighboring capacitor stack. The capacitor stacks are stacked on top of each other between the top plate and the bottom plate and may be compressed between the top plate and the bottom plate by way of the compression member. In such configuration, it may be ensured that the top plate already applies a relatively uniform pressure to the neighboring capacitor stack, so that this capacitor stack can transmit relatively a uniform pressure to the neighboring capacitor stack and so on. This may be similar for the bottom plate.

In an embodiment, the pressure distribution element is arranged adjacent to a top layer or a bottom layer of the neighboring capacitor stack, and the pressure distribution element covers a portion of or covers the complete top layer or bottom layer, respectively. The pressure distribution element may for example comprise a disc or other shape that is smaller than the top or bottom layer and that is centrally arranged on the top or bottom layer in order to increase the pressure applied to the central portion of the capacitor stack. In other embodiments, where the pressure distribution element covers the whole surface of the top layer or bottom layer, an adjustment of the pressure distribution may for example be obtained by different heights of the pressure distribution element, or by material properties, for example compressibility, of the pressure distribution element.

The pressure distribution element may in particular be configured to adjust the distribution of the pressure by way of its geometry and/or by way of its compressibility.

Each capacitor stack may have four side surfaces, and two side surfaces on opposite sides of the capacitor stack may at least partially be metalized. The capacitor stacks may be stacked such that the metalized side surfaces are arranged on top of each other. In particular, the metalized side surfaces may constitute terminals, in particular a high voltage terminal and a low voltage terminal, and the corresponding terminals may be arranged on top of each other in the capacitor assembly. In such arrangement, a safe distance between high-voltage terminals and low voltage terminals of the capacitor stacks can be maintained. It is noted that high-voltage terminal and low-voltage terminal are used as relative terms herein and do not relate to a particular voltage range.

As an example, the metallization may be between about 0.2 and about 3 millimeters thick, and the metallization may comprise zinc, aluminum, lead, or other suitable metals.

In an embodiment, each capacitor stack has an extension in lateral direction between the opposite metalized side surfaces, and the pressure distribution element has an extension in the lateral direction that is smaller than the extension of the capacitor stacks in this direction. The pressure distribution element may further be arranged such that the pressure distribution element does not protrude from between the metalized side surfaces of adjacent capacitor stacks. In such configuration, it may be avoided that the pressure distribution element is compressed by the metalized side surfaces, and that a relatively high pressure is built up in these areas.

In an embodiment, the sides of the pressure distribution element which are located adjacent to the metalized side surfaces are tapered. In such configuration, it may be possible to relatively smoothly redistribute the pressure from the metalized side surface towards a central portion of the respective capacitor stack. Tapered means that the thickness of the pressure distribution element becomes smaller towards the respective metalized side surface.

The pressure distribution element may be a layer or sheet of resilient material. By making use of resilient material, the pressure may be redistributed effectively from the peripheral portion of the capacitor stack to the central portion of the capacitor stack, while such pressure distribution element may be manufactured with relatively large tolerances regarding its geometry. Other configurations of the pressure distribution element are of course conceivable, such as a ring shape, a circular shape, plural dot shapes, and the like, depending on the necessary redistribution of the pressure.

The layer or sheet of resilient material may for example be made from a material selected from the group comprising or consisting of a plastic material, a polymer material, rubber, an elastomeric material, or silicon.

In another embodiment, the layer or sheet of resilient material protrudes at least from between the metalized side surfaces of adjacent capacitor stacks. A mechanical decoupling of adjacent capacitor stacks may thus be achieved.

In a further embodiment, the pressure distribution element may be a layer or sheet of a rigid material. Pressure distribution may occur by adjusting the geometry of the layer or sheet of stiff or rigid material in such configuration.

The rigid material may be an isolating material, in particular a stiff or rigid polymer material or a glass or ceramic material or the like.

In some embodiments in which the pressure distribution arrangement comprises plural pressure distribution elements, for example between plural capacitor stacks or capacitor stacks and top plate or bottom plate, the plural pressure distribution elements can have the same configuration or can have different configurations. For example, some pressure distribution elements may be made of a resilient material while others may be made of a rigid material.

The layer structure of each capacitor stack may comprise dielectric layers and metal films disposed on the dielectric layers in alternating order. The layer structure may be a substantially planar layer structure. The dielectric layers may be made of polypropylene. The dielectric layers may for example have a thickness between about one micrometer and several hundred micrometers.

The support assembly may comprise a top plate and a bottom plate. The capacitor stacks may be arranged and compressed between the top plate and the bottom plate, and the support assembly may further comprise a bearing plate and a guiding element arranged between the bearing plate and the bottom plate. The top plate may be movable along the guiding element, and the compression member may comprise a spring element which bears against the bearing plate and which urges the top plate towards the bottom plate so as to compress the capacitor stacks. A relatively compact and robust capacitor assembly may be obtained with such configuration which is capable of providing the required pressure to compress the capacitor stacks and to prevent delamination and buckling of the layer structure.

The spring element may for example be a leaf spring or a coil spring, and the guiding element may be provided by one or more guiding rods. In an example configuration, four guiding rods may be provided along which the top plate moves, and the bearing plate may be a metal plate, with a leaf spring being arranged between the bearing plate and the top plate. In another example, the bearing plate may be provided by four circular plates, e.g. washers, which are mounted to the ends of the four guiding rods, and coil springs may bear against these circular bearing plates and against the top plate to provide compression.

The capacitor assembly may comprise a first busbar and a second busbar. The metalized side surface on one side of the capacitor stacks may be electrically connected to the first busbar and the metalized side surface on the other opposite side of the capacitor stacks may be electrically connected to the second busbar. An efficient and secure electrical contacting of the capacitor stacks may thus be realized. By making use of busbars, which may be copper bars, relatively high currents may be used for charging and discharging the capacitor assembly. The wire may for example be soldered to each metalized side surface for contacting the respective busbar.

According to a further embodiment of the invention, a subsea device, in particular a subsea variable speed drive, is provided. The subsea device comprises a subsea enclosure filled with dielectric liquid and a pressure compensator configured to balance the pressure inside the subsea enclosure to a pressure prevailing in a medium outside the subsea enclosure. Furthermore, the device comprises a capacitor assembly that is configured in accordance with any of the described embodiments. The capacitor assembly is arranged in the subsea enclosure and is submerged in the dielectric liquid. The capacitor assembly is exposed to the pressure inside the subsea enclosure. By using the capacitor assembly in such subsea device, advantages similar to the ones outlined further above may be achieved.

According to a further embodiment of the invention, a method of assembling a capacitor assembly is provided. The method comprises the steps of providing a support assembly, stacking at least two capacitor stacks in the support assembly and providing between neighboring capacitor stacks a pressure distribution element when stacking the capacitor stacks. The capacitor stacks are metalized film capacitor stacks having a layer structure including a top layer and a bottom layer, and the capacitor stacks are stacked on top of each other. By providing the pressure distribution element between neighboring capacitor stacks, a pressure distribution arrangement is obtained. A further step includes the compression of the at least two capacitor stacks in the direction substantially perpendicular to the layer structure by way of a compression member of the support assembly. The pressure distribution arrangement is provided so as to adjust the distribution of the pressure applied to the capacitor stacks by the compression member. The layers of the capacitor stacks may experience compression when the capacitor assembly is deployed in a high pressure environment. The pressure distribution arrangement may be configured so as to provide a more uniform distribution of the pressure across the layer structure of the capacitor stacks when the capacitor assembly is deployed in a high pressure environment in which layers of the capacitor stacks experience compression.

By way of such method, a capacitor assembly may be manufactured which provides advantages similar to the ones outlined further above.

In an embodiment, the pressure distribution arrangement is provided so as to adjust the distribution of the pressure applied to the capacitor stacks by the compression member by decreasing the pressure applied to a peripheral portion of the capacitor stacks and increasing the pressure applied to a central portion of the capacitor stacks. Pressure differences across the area of the capacitor stacks may thus be reduced.

In an embodiment of the method, the method may be performed so as to arrive at a capacitor assembly configured in accordance with any of the described embodiments and configurations.

In a further embodiment, the method comprises the steps of placing the capacitor in a pressure compensated subsea enclosure, and filling the pressure compensated subsea enclosure with a dielectric liquid under vacuum. This means, the formation of gas bubbles in the capacitor assembly may be avoided, thereby improving the reliability of the capacitor assembly.

It is to be understood that the features mentioned above and those that are explained below can be used not only in the respective combinations indicated, but also in other combinations or in isolation, without leaving the scope of the present invention. For example, method steps described above with respect to the capacitor assembly may form part of embodiments of the method.

In the following, the embodiments illustrated in the accompanying drawings are described in more detail. It should be clear that the following description is only illustrative and non-restrictive. The drawings are only schematic representations, and elements in the drawings are not necessarily to scale with each other.

Figure 1:
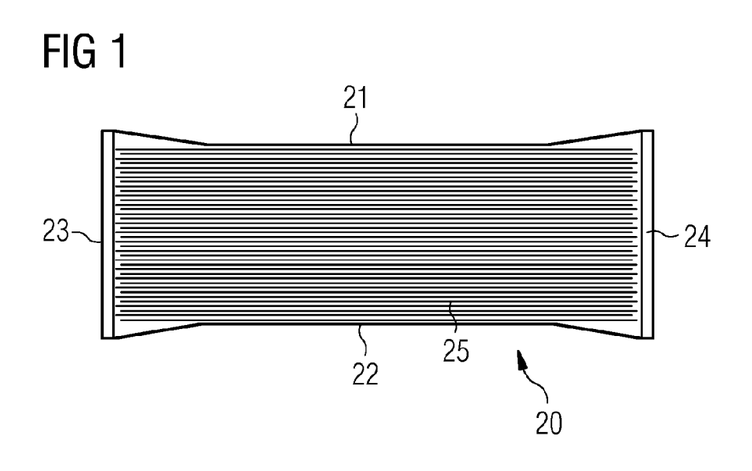
FIG. 1 is a schematic drawing showing a sectional side view of a capacitor stack that can be used with embodiments of the invention.

FIG. 1 shows a capacitor stack 20 which is a metalized film capacitor stack. It comprises a layer structure 25, with alternating metal and dielectric layers. The dielectric layers may for example be polypropylene layers onto which a metal film is applied to form the respective metal layer. The layer structure 25 may thus also be termed film package. The capacitor stack 20 has a top layer 21 and a bottom layer 22, which might be the same as the dielectric layers in the layer structure 25, or might be different layers, for example thicker layers, layers formed of a different material or the like.

The capacitor stack 20 has four sides, two of which are parallel to the drawing plane, and two of which are shown in section at the left and right ends of the capacitor stack in the sectional view of FIG. 1. To form the contact terminals for the capacitor stack 20, the two opposite side surfaces 23, 24 of capacitor stack 20 are metalized. The metal films in the layer structure 25 are such that for neighboring metal layers (separated by a dielectric layer), one layer is in contact with the metalized side surface 23 and the other in contact with the metalized side surface 24. This can be achieved by applying the metal film with a certain margin onto the respective dielectric layer, by staggering the layer structure 25 or the like. Accordingly, the layer structure 25 essentially forms a parallel connection of a plurality of capacitances, each capacitance being formed by two neighboring metal layers separated by a dielectric layer and connected to the respective metalized side surface 23 and 24.

The side surfaces 23, 24 may for example be metalized by applying a metal spray, for example using a metal such as zinc, lead, aluminum, a zinc and aluminum mixture or the like. Furthermore, an additional outer layer of tin spray may be applied to improve solderability of wires or the like to the terminals formed by the metalized side surfaces 23, 24.

The two further side surfaces which are parallel to the drawing plane are not metalized, these are the sides where the capacitor stack 20 is cut out of a stacked or flat winding, during which cutting process the dielectric material may melt and seal the respective side face, yet this is generally not a fluid-tight sealing.

Figure 2:
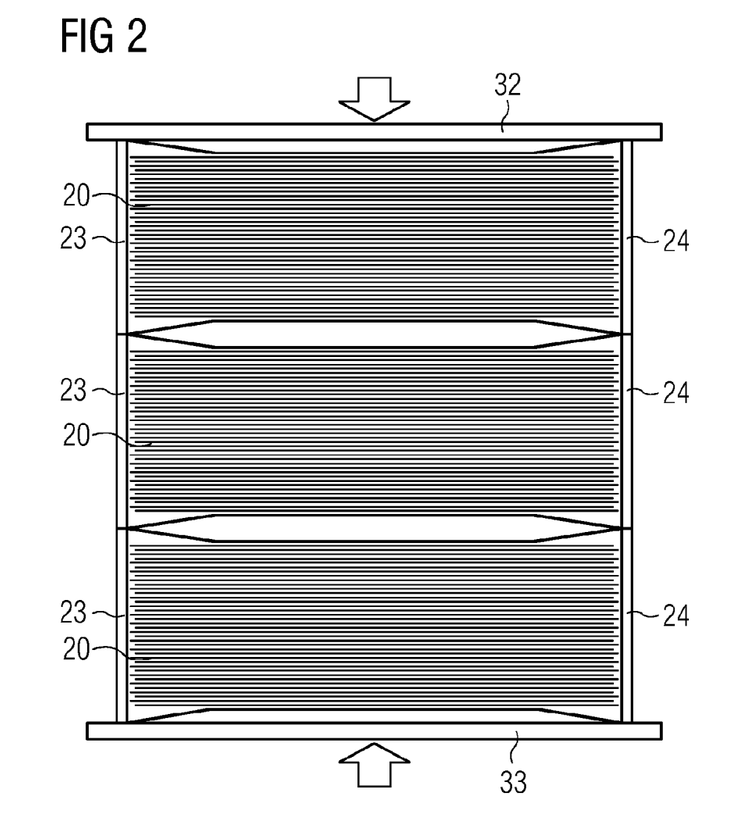
FIG. 2 is a schematic drawing showing a sectional side view of a capacitor assembly comprising plural capacitor stacks.

As illustrated in FIG. 2, to achieve a higher capacitance, several such capacitor stacks 20 can be stacked on top of each other. On top of each other means that the top layer 21 or the respective top surface of a capacitor stack faces the bottom layer 22 or bottom surface of the adjacent capacitor stack 20. As indicated by the arrows, the capacitor stacks 20 are compressed between the top plate 32 and the bottom plate 33. The compressive force is applied substantially perpendicular to the layer structure 25. The capacitor stacks 20 are stacked in such a way that corresponding metalized side surfaces, i.e. the corresponding electric terminals, are stacked on top of each other. In other words, the metalized side surfaces 23 are stacked on top of each other, and the metalized side surfaces 24 are stacked on top of each other, as illustrated.

Due to the metallization on the side surfaces of the capacitor stacks, the dimension, in particular the thickness of the capacitor stack at the respective side surfaces may be different from the dimension/thickness of the remaining portions of the capacitor stack. Furthermore, the respective side surfaces may due to the metallization have a different compressibility compared to the remaining portions of the capacitor stack. In particular when exposed to a high pressure environment in a pressure compensated subsea enclosure, the dielectric layers may be compressed while the metalized side surfaces retain their shape. As illustrated in FIG. 2, this can lead to a situation in which the metalized side surfaces 23, 24 bear most of the pressure applied by the top and bottom plates 32, 33. In FIG. 2, the arrow indicates the spaced formed by the compression of the layer structure due to the applied pressure. Note that this difference is thickness of the capacitor stacks 20 between metalized side surfaces 23, 24 and the central portion is exaggerated in the FIGS. 1-4 for the purpose of illustration.

Depending on the pressure of the medium in which the capacitor assembly is deployed, the central portions of the capacitor stacks 20 might still experience some compressive force applied by top and bottom plates 32, 33, yet the compression might not be strong enough to prevent a degradation of the layer structure 25, in particular a delamination or wrinkling or buckling of the layer structure 25.

Figure 3:
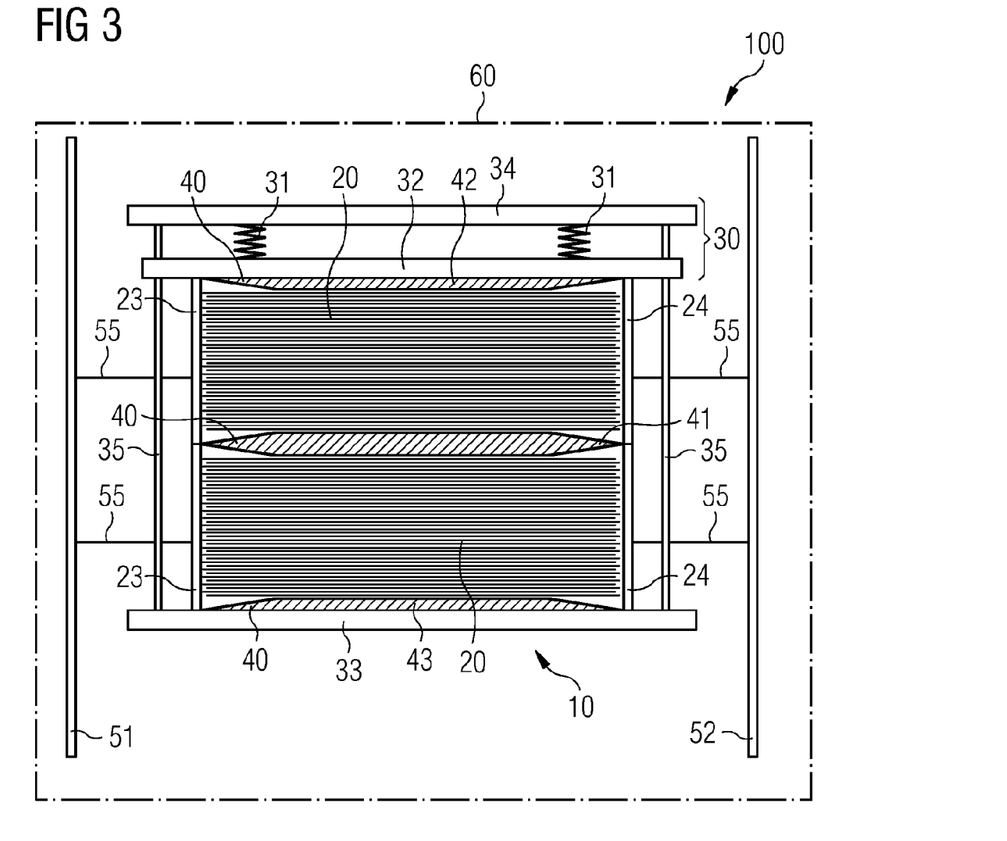
FIG. 3 is a schematic drawing showing a sectional side view of a capacitor assembly according to an embodiment of the invention.

FIG. 3 shows a capacitor assembly 10 according to an embodiment of the invention. Capacitor assembly 10 employs two or more capacitor stacks 20 which are compressed between the top plate 32 and the bottom plate 33, and the explanations given above with respect to FIGS. 1 and 2 apply correspondingly. Top plate 32 and bottom plate 33 form part of a support assembly 30, which further comprises the bearing plate 34 and a guide element 35. The guide element 35 comprises guiding rods which are mounted between the bottom plate 33 and the bearing plate 34, top plate 32 being moveable along the guiding rods. Support assembly 30 further includes a compression member 31, which in the example of FIG. 3 is implemented in the form of coil springs, but may be implemented differently, for example as leaf springs or the like. The compression member 31 bears against the bearing plate 34 and urges the top plate 32 towards bottom plate 33, thereby compressing the capacitor stacks 20.

It should be noted that the support assembly 30 may be implemented differently. In another possible configuration, bearing plate 34 may for example be provided in form of several washers attached to the ends of the guiding rods, and a coil spring can be arranged between the respective washer and the top plate 32 for urging the top plate 32 towards bottom plate 33.

The capacitor assembly 10 further includes a pressure distribution arrangement 40. The pressure distribution arrangement 40 is configured to redistribute the pressure applied to the capacitor stacks 20 by decreasing the pressure applied to a peripheral portion of the capacitor stacks 20, in particular to the metalized side surfaces 23, 24 of the capacitor stacks 20, and to increase the pressure applied to a central portion of the capacitor stacks 20. For this purpose, the pressure distribution arrangement 40 comprises the pressure distribution element 41 arranged between the two adjacent capacitor stacks 20. Furthermore, it comprises the pressure distribution element 42 arranged between the top plate 32 and the adjacent capacitor stack 20, and the pressure distribution element 34 arranged between the bottom plate 33 and the adjacent capacitor stack 20.

In some embodiments, it may not be necessary to provide the pressure distribution elements 42 and 43, and to simply provide a thicker pressure distribution element 41 or to shape the top plate 32 and the bottom plate 33 differently or the like. If further capacitor stacks 20 are included in the capacitor assembly 10, further pressure distribution elements 41 may be provided between these further capacitor stacks 20.

In the embodiment of FIG. 3, the capacitor stacks 20 are wider in lateral direction than the pressure distribution elements 41, 42, 43. The pressure distribution elements accordingly do not protrude from the capacitor stacks 20. Furthermore, the pressure distribution elements are tapered at their ends towards the metalized side surfaces 23, 24 of the capacitor stacks 20. The tapering can be adjusted to provide the desired adjustment of the pressure distribution from the peripheral side surfaces towards the central portion of the capacitor stacks 20.

In such configuration, the pressure distribution elements are confined within the capacitor stacks 20, and are furthermore not compressed between the metalized side surfaces of the capacitor stacks 20.

The pressure distribution elements 41, 42, 43 are made of a resilient material, i.e. a flexible material that can be compressed by the force applied to the top plate 32. In areas with higher force application, such resilient material will be compressed more, thus effectively distributing the pressure from such areas towards areas where there is less compression of the resilient material. In other embodiments, the pressure distribution elements may be made of a rigid material, which does essentially not compress at the pressures applied by the support assembly 30. Such pressure distribution elements may be manufactured in a shape that provides the desired pressure redistribution. Compared to such rigid material pressure distribution elements, the use of a resilient material has the advantage that the pressure distribution elements can be manufactured with a higher tolerance. Further, by using a layer or sheet of resilient material, tolerances in the dimensions of the capacitor stacks, in particular irregularities in the top or bottom surface of the capacitor stack, such as an uneven profile, in particular bumps or an uneven thickness distribution, may be compensated for. The required pressure can thus be applied to the layers of the capacitor stack, and a relatively even pressure distribution over the whole surface can be ensured.

As illustrated in FIG. 3, the pressure distribution elements may be tapered towards the areas with higher pressure, i.e. may be thinner, and may be thicker in areas with lower pressure to which the pressure is to be redistributed.

FIG. 3 further shows a first busbar 51 and a second busbar 52 which connect to the terminals of the capacitor stacks 2. For this purpose, wires 55 are provided which are on one end connected to the respective busbar 51, 52, for example by a bolted connection, and which are on the other end soldered to the respective metalized side surface 23, 24 of the capacitor stacks 20. In such configuration, a plurality of capacitor stacks 20 may be contacted electrically in an efficient manner. Furthermore, the use of busbars 51, 52 ensures that the use of high currents for charging and discharging the capacitor stacks 20 of the capacitor assembly 10 becomes possible.

In some embodiments, the capacitor assembly 10 can comprise between 3 and 25 capacitor stacks 20. As an example, between 10 and 20 capacitor stacks 20 may be used. Such number of capacitor stacks allows a relatively high capacitance of capacitor assembly 10, while at the same time ensures that a compressive force is efficiently and substantially uniformly applied to the capacitor stacks 20 so as to allow subsea use of capacitor assembly 10.

FIG. 3 further illustrates a subsea device 100 which comprise a subsea enclosure 60 in which the capacitor assembly 10 is disposed. Subsea enclosure 60 is filled with a dielectric liquid, and the capacitor assembly 10, in particular the capacitor stacks 20, are directly exposed to the dielectric liquid. Subsea enclosure 60 is pressure compensated. For this purpose, it may comprise a pressure compensator (not shown), such as a bellows type, membrane type or bladder type compensator which balances the pressure inside the subsea enclosure 60 to a pressure prevailing outside the subsea enclosure 60, for example in a surrounding subsea environment. Accordingly, when subsea device 100 is deployed on the ocean floor, the subsea pressure is transmitted via the pressure compensator to the interior of subsea enclosure 60, so that the capacitor assembly 10 is exposed to the full subsea pressure. By way of the support assembly 30 and the pressure distribution arrangement 40, it is ensured that even though the capacitor stacks 20 are exposed to the subsea pressure, buckling, wrinkling, or delamination of the layer structure of the capacitor stacks 20 does not occur. Subsea device 100 may be configured to be operable to at least 3,000 m water depth, and accordingly, the capacitor assembly 10 may be configured to be operable in a high pressure environment up to a pressure of at least 300 bar, in particular in a dielectric liquid environment.

It should be noted that in FIG. 3, the subsea enclosure 60 is only shown as an example, and the capacitor assembly 10 may be disposed in a more complex enclosure structure. For example, the capacitor assembly 10 may be disposed in an intermediate enclosure, which may again be pressure compensated and filled with dielectric liquid, or which may be an open disclosure having slots or the like for allowing an exchange of liquid, which intermediate disclosure in turn is disposed in the subsea enclosure 60. Other configurations are of course conceivable. Note that busbars 51, 52 and the respective wires 55 are optional and are only one possible configuration, and other devices/ways of electrically contacting the capacitor stacks 20 may be employed.

FIG. 4 shows a capacitor assembly 10 according to a further embodiment of the invention. The capacitor assembly 10 of FIG. 4 is a modification of the capacitor assembly 10 of FIG. 3, so the explanations given above are equally applicable. Support assembly 30, bus bars 50, 51, 52 and subsea enclosure 60 are not shown in FIG. 4, although they may certainly be present in any of the above described configurations.

Figure 4A:
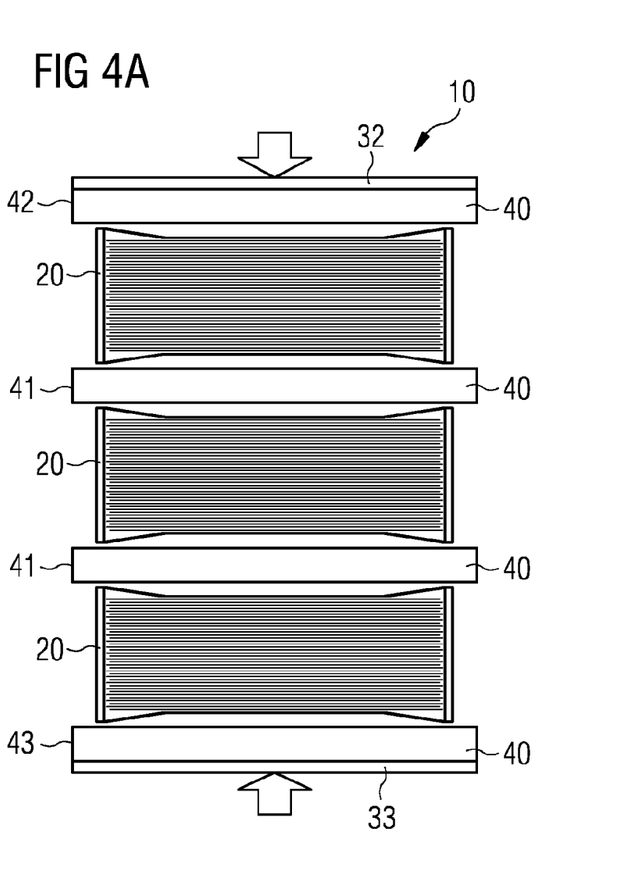
FIGS. 4A and 4B are schematic drawings showing sectional side views of a capacitor assembly according to an embodiment of the invention before compression and after compression.

FIG. 4A shows the capacitor assembly 10 prior to compression. The pressure distribution arrangement 40 comprises the resilient sheets or layers 41 between the capacitor stacks 20, and the resilient sheets or layers 42, between the top plate 32 or the bottom plate 33, respectively, and the neighboring stack 20. The resilient layers or sheets 41, 42, 43 protrude from the capacitor stacks 20 in the lateral direction. As illustrated by arrows, a compressive force is applied to top and bottom plates 32, 33.

Figure 4B:
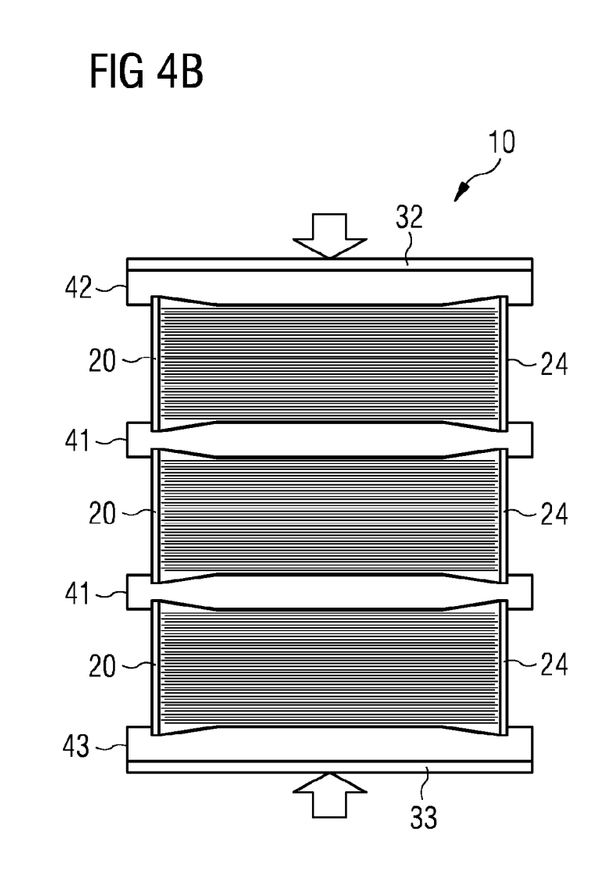

FIG. 4B illustrates the capacitor assembly 10 in the compressed state. As can be seen, the sheets or layers of resilient material 41, 42, 43 are compressed between the capacitor stacks 20 and between the top or bottom plates 32, 33 and the respective neighboring capacitor stack 20. Due to their resiliency, the sheets or layers 41, 42, 43 are compressed significantly between the metalized side surfaces, and deform accordingly. In the central portion between the capacitor stacks 20, the resilient sheets or layers 41, 42, 43 deform less but cause the application of pressure to the neighboring top and bottom layers of capacitor stacks 20. Accordingly, the pressure is effectively redistributed from the peripheral portions of the capacitor stacks 20, in particular from the metalized side surfaces thereof, to the central portion of the capacitor stacks 20. A relatively uniform application of compressive force over the whole area of the top or bottom layers of the capacitor stacks 20 is thus achieved.

In such configuration, differences in the thickness of the dielectric and metal film layers in the layer structure of the capacitor stacks 20, and in the metallization can be absorbed effectively by the resiliency of the flexible sheets 41, 42, 43. Furthermore, by making use of resilient layers or sheets having a substantially rectangular cross section, as illustrated in FIGS. 4A, 4B, manufacturing of the sheets or layers 41, 42, 43 is relatively simple and placement relative to the capacitor stacks 20 is not critical, since any misalignment does not have any significant effect on the pressure redistribution performed by the respective sheets or layers.

In summary, embodiments of the pressure distribution arrangement 40 are described herein which make use of pressure distribution elements 41, 42, 43 that can be made of resilient material or of rigid material. These elements can be tapered at their sides adjacent to the metalized side surfaces of the respective capacitor stacks or not, and they may protrude from the capacitor stacks or may not protrude therefrom. A mix of different configurations of the pressure distribution elements 41, 42, 43 in the same pressure distribution arrangement 40 is also possible. As explained above, these configurations achieve an effective redistribution of the pressure from a peripheral portion of the capacitor stacks, in particular form the metalized side surfaces, towards a central portion of the capacitor stacks, so that the application of pressure can be made more uniform, thus improving the reliability for subsea operation. Furthermore, the described embodiments allow the stacking of capacitor stacks 20 so as to achieve a desired capacitance value of the capacitor assembly 10.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A capacitor assembly comprising:
   at least two capacitor stacks, the at least two capacitor stacks each including a layer structure including plural layers including a top layer and a bottom layer, wherein the plural layers of the at least two capacitor stacks experience compression when the capacitor assembly is deployed in a high pressure environment;
   a support assembly to support the at least two capacitor stacks, wherein the at least two capacitor stacks are stacked on top of each other in the support assembly, the support assembly including a compression member to compress the at least two capacitor stacks in a direction substantially perpendicular to the layer structure to apply a compressive force to the layer structure so as to allow a deployment of the capacitor assembly in a high pressure environment; and
   a pressure distribution arrangement, configured to adjust distribution of pressure applied to the at least two capacitor stacks by the compression member so as to provide a relatively more uniform distribution of the pressure across the layer structure of the at least two capacitor stacks when the capacitor assembly is deployed in a high pressure environment in which the plural layers of the at least two capacitor stacks experience compression.

2. The capacitor assembly according to claim 1, wherein the pressure distribution arrangement is configured to adjust the distribution of the pressure such that respective pressure differences over an area of the plural layers of the at least two capacitor stacks are relatively reduced.

3. The capacitor assembly of claim 1, wherein each of the at least two capacitor stacks includes a respective design pressure range for the compression of a respective one of the at least two capacitor stacks by way of the compression member, wherein the pressure distribution arrangement is configured to adjust the distribution of the pressure such that over the area of the respective capacitor stack, a variation of the applied pressure is relatively smaller than the respective design pressure range.

4. The capacitor assembly of claim 3, wherein the design pressure range lies within the pressure range of about 1 bar to about 50 bar.

5. The capacitor assembly of claim 3, wherein the applied pressure is within the respective design pressure range.

6. The capacitor assembly of claim 2, wherein each of the at least two capacitor stacks includes a respective design pressure range for the compression of a respective one of the at least two capacitor stacks by way of the compression member, wherein the pressure distribution arrangement is configured to adjust the distribution of the pressure such that over the area of the respective capacitor stack, the variation of the applied pressure is relatively smaller than the design pressure range.

7. The capacitor assembly of claim 6, wherein the applied pressure is within the respective design pressure range.

8. The capacitor assembly of claim 3, wherein the design pressure range lies within the pressure range of about 1 bar to about 20 bar.

9. The capacitor assembly of claim 6, wherein the design pressure range lies within the pressure range of about 1 bar to about 50 bar.

10. The capacitor assembly of claim 9, wherein the design pressure range lies within the pressure range of about 1 bar to about 20 bar.

11. The capacitor assembly of claim 2, wherein the pressure distribution arrangement is configured to adjust the distribution of the pressure applied to the at least two capacitor stacks by the compression member by relatively decreasing the pressure applied to a peripheral portion of the at least two capacitor stacks and relatively increasing the pressure applied to a central portion of the at least two capacitor stacks.

12. The capacitor assembly of claim 2, wherein the pressure distribution arrangement is configured such that the pressure applied by way of the compression member to the top or bottom layer of one of the at least two capacitor stacks is substantially uniform over the area of the top or bottom layer.

13. The capacitor assembly of claim 2, wherein the pressure distribution arrangement includes a pressure distribution element arranged between the at least two capacitor stacks.

14. The capacitor assembly of claim 2, wherein the at least two capacitor stacks includes at least three capacitor stacks, and wherein the pressure distribution arrangement includes a respective pressure distribution element arranged between each two respective neighboring ones of the at least three capacitor stacks.

15. A subsea device, comprising:
a subsea enclosure filled with dielectric liquid;
a pressure compensator configured to balance pressure inside the subsea enclosure to a pressure prevailing in a medium outside the subsea enclosure; and
the capacitor assembly of claim 2, the capacitor assembly being arranged in the subsea enclosure and being submerged in the dielectric liquid, and the capacitor assembly being exposed to the pressure inside the subsea enclosure.

16. The capacitor assembly of claim 1, wherein the pressure distribution arrangement is configured to adjust the distribution of the pressure applied to the at least two capacitor stacks by the compression member by relatively decreasing the pressure applied to a peripheral portion of the at least two capacitor stacks and relatively increasing the pressure applied to a central portion of the at least two capacitor stacks.

17. The capacitor assembly of claim 1, wherein the pressure distribution arrangement is configured such that the pressure applied by way of the compression member to the top or bottom layer of one of the at least two capacitor stacks is substantially uniform over the an area of the top or bottom layer.

18. The capacitor assembly of claim 1, wherein the pressure distribution arrangement includes a pressure distribution element arranged between the at least two capacitor stacks.

19. The capacitor assembly of claim 18, wherein at least one of
the support assembly includes a top plate and a bottom plate,
the pressure distribution arrangement includes a pressure distribution element arranged between the top plate and a neighboring capacitor stack of the at least two capacitor stacks, and
the pressure distribution arrangement includes a pressure distribution element arranged between the bottom plate and a neighboring capacitor stack of the at least two capacitor stacks.

20. The capacitor assembly of claim 18, wherein each respective pressure distribution element includes at least one of a compressibility and geometry that is adapted so as to provide the adjustment of the distribution of the pressure applied to each respective one of the at least two capacitor stacks.

21. The capacitor assembly of claim 18, wherein each of the at least two capacitor stack includes four side surfaces, wherein two of the four side surfaces, on opposite sides, are at least partially metalized, and wherein the at least two capacitor stacks are stacked such that the two of the four at least partially metalized side surfaces are arranged on top of each other.

22. The capacitor assembly of claim 21, wherein each of the at least two capacitor stacks includes an extension in lateral direction between the opposite metalized side surfaces, wherein the pressure distribution element includes an extension in the lateral direction that is relatively smaller than the extension of the at least two capacitor stacks, the pressure distribution element being arranged such that the pressure distribution element does not protrude from the metalized side surfaces.

23. The capacitor assembly of claim 22, wherein at least the sides of the pressure distribution element, located adjacent to the metalized side surfaces, are tapered.

24. The capacitor assembly of claim 21, wherein at least the sides of the pressure distribution element that are located adjacent to the metalized side surfaces are tapered.

25. The capacitor assembly of claim 21, wherein the layer or sheet of resilient material protrudes at least from between the metalized side surfaces of adjacent one of the at least two capacitor stacks.

26. The capacitor assembly of claim 18, wherein the pressure distribution element is a layer or sheet of resilient material.

27. The capacitor assembly of claim 26, wherein the layer or sheet of resilient material is made from a material selected from the group comprising a plastic material, a polymer material, rubber, an elastomeric material, and silicone.

28. The capacitor assembly of claim 18, wherein the pressure distribution element is a layer or sheet of rigid or stiff material.

29. The capacitor assembly of claim 1, wherein the at least two capacitor stacks include at least three capacitor stacks, and wherein the pressure distribution arrangement includes a respective pressure distribution element arranged between each two respective neighboring ones of the at least three capacitor stacks.

30. The capacitor assembly of claim 29, wherein at least one of
the support assembly includes a top plate and a bottom plate,
the pressure distribution arrangement includes a pressure distribution element arranged between the top plate and a neighboring capacitor stack of the at least three capacitor stacks, and
the pressure distribution arrangement includes a pressure distribution element arranged between the bottom plate and a neighboring capacitor stack of the at least three capacitor stacks.

31. The capacitor assembly of claim 29, wherein each respective pressure distribution element includes at least one of a compressibility and geometry that is adapted so as to provide the adjustment of the distribution of the pressure applied to each respective one of the at least three capacitor stacks.

32. The capacitor assembly of claim 29, wherein each of the at least three capacitor stack includes four side surfaces, wherein two of the four side surfaces, on opposite sides, are at least partially metalized, and wherein the at least three capacitor stacks are stacked such that the two of the four at least partially metalized side surfaces are arranged on top of each other.

33. The capacitor assembly of claim 32, wherein each of the at least three capacitor stacks includes an extension in lateral direction between the opposite metalized side surfaces, wherein the pressure distribution element includes an extension in the lateral direction that is relatively smaller than the extension of the at least three capacitor stacks, the pressure distribution element being arranged such that the pressure distribution element does not protrude from the metalized side surfaces.

34. The capacitor assembly of claim 33, wherein at least sides of the pressure distribution element, located adjacent to the metalized side surfaces, are tapered.

35. A subsea device, comprising:
a subsea enclosure filled with dielectric liquid;
a pressure compensator configured to balance pressure inside the subsea enclosure to a pressure prevailing in a medium outside the subsea enclosure; and
the capacitor assembly of claim 29, the capacitor assembly being arranged in the subsea enclosure and being submerged in the dielectric liquid, and the capacitor assembly being exposed to the pressure inside the subsea enclosure.

36. The capacitor assembly of claim 1, wherein the support assembly includes a top plate and a bottom plate, the at least two capacitor stacks being arranged and compressed between the top plate and the bottom plate, wherein the support assembly further includes a bearing plate and a guiding element arranged between the bearing plate and the bottom plate, wherein the top plate is movable along the guiding element, and wherein the compression member includes a spring element to bear against the bearing plate and to urge the top plate towards the bottom plate so as to compress the at least two capacitor stacks.

37. A subsea device, comprising:
a subsea enclosure filled with dielectric liquid;
a pressure compensator configured to balance pressure inside the subsea enclosure to a pressure prevailing in a medium outside the subsea enclosure; and
the capacitor assembly of claim 1, the capacitor assembly being arranged in the subsea enclosure and being submerged in the dielectric liquid, and the capacitor assembly being exposed to the pressure inside the subsea enclosure.

38. The subsea device of claim 37, wherein the subsea device is a subsea variable speed drive.

39. A method of assembling a capacitor assembly, comprising:
providing a support assembly;
stacking at least two capacitor stacks in the support assembly, the at least two capacitor stacks including a layer structure with a plurality of layers including a top layer and a bottom layer, wherein the layers of the at least two capacitor stacks experience compression when the capacitor assembly is deployed in a high pressure environment, and wherein the at least two capacitor stacks are stacked on top of each other in the support assembly;
providing, between neighboring ones of the at least two capacitor stacks, a pressure distribution element when stacking the at least two capacitor stacks so as to provide a pressure distribution arrangement; and
compressing, via a compression member of the support assembly, the at least two capacitor stacks in a direction substantially perpendicular to the layer structure to apply a compressive force to the layer structure so as to allow a deployment of the capacitor assembly in a high pressure environment,
wherein the pressure distribution arrangement is configured to adjust the distribution of the pressure applied to the at least two capacitor stacks by the compression member so as to provide a relatively more uniform distribution of the pressure across the layer structure of the at least two capacitor stacks when the capacitor assembly is deployed in a high pressure environment in which layers of the at least two capacitor stacks experience compression.

* * * * *